United States Patent [19]

Nagano

[11] 4,322,136
[45] Mar. 30, 1982

[54] MICROSCOPE OBJECTIVE LENS SYSTEM

[75] Inventor: Chikara Nagano, Tokyo, Japan

[73] Assignee: Olympus Optical Co., Ltd., Hachiouji, Japan

[21] Appl. No.: 99,003

[22] Filed: Nov. 30, 1979

Related U.S. Application Data

[63] Continuation-in-part of Ser. No. 949,254, Oct. 6, 1978, abandoned.

[30] Foreign Application Priority Data

May 10, 1977 [JP] Japan .................. 52-124298

[51] Int. Cl.³ .................................. G02B 21/02
[52] U.S. Cl. ................................................ 350/414
[58] Field of Search ................................... 350/414

[56] References Cited

U.S. PATENT DOCUMENTS

| | | | |
|---|---|---|---|
| 2,644,943 | 7/1953 | Klein | 350/414 |
| 3,744,881 | 7/1973 | Taira | 350/414 |
| 3,802,765 | 4/1974 | Vuijk | 350/467 |
| 3,806,231 | 4/1974 | Taira | 350/414 |
| 3,925,910 | 12/1975 | Matsubara | 350/414 |

*Primary Examiner*—John K. Corbin
*Assistant Examiner*—Rebecca D. Gass
*Attorney, Agent, or Firm*—Cushman, Darby & Cushman

[57] ABSTRACT

A microscope objective lens system by using a Gauss type lens system, in which the N. A. is large, the working distance is long, the image surface is flat over a wide angle of view and various aberrations are well corrected. The system comprises a first lens component comprising two or three single positive lenses, a second lens component comprising a cemented meniscus lens having its convex surface faced to the object side, a third lens component comprising a cemented meniscus lens having its concave surface faced to the object side, and a fourth lens component comprising a single positive lens.

6 Claims, 7 Drawing Figures

MICROSCOPE OBJECTIVE LENS SYSTEM

This application is a continuation in-part of Ser. No. 949,254 filed Oct. 6, 1978 now abandoned.

FIELD OF THE INVENTION

The present invention relates to a microscope objective lens system having a magnification in the order of 10×, a flat image surface and a long working distance.

DESCRIPTION OF THE PRIOR ART

An objective lens system having a flat image surface in which a meniscus lens that has an excessively concaved surface at its object side is arranged as a first lens component or in which a meniscus lens having an excessively concaved surface is arranged in a rear lens component has been well known. Such conventional lens systems have disadvantages in that it is not possible for the first-mentioned system to have a long working distance and, for the second-mentioned system also, attempts to make the working distance longer only resulted in an increase in chromatic spherical aberrations. Also an objective lens system of a Gauss type has been known, and by using an objective lens system of this type, it is possible to have a long working distance and, moreover, to maintain good chromatic aberration conditions, however, a conventional objective lens system of this type was not fully satisfactory from the viewpoint of working distance. And, there were only a few which had a sufficiently flat image surface over a wide angle of view.

SUMMARY OF THE INVENTION

It is an object of the present invention to provide a microscope objective lens system by using a Gauss type lens system, in which the N.A. is large, the working distance is long, the image surface is flat over a wide angle of view and various aberrations are well corrected.

The microscope objective lens system according to the present invention comprises a first lens component including at least two or three single positive lenses, a second lens component including a cemented meniscus lens having its convex surface faced to the object side, a third lens component including a cemented lens having its concave surface faced to the object side, and a fourth lens component including a single positive lens.

Further objects and advantages will be apparent in the arrangements as set forth in the following specification taken together with the accompanying drawings.

DESCRIPTION OF THE PREFERRED EMBODIMENTS

Figure 1:
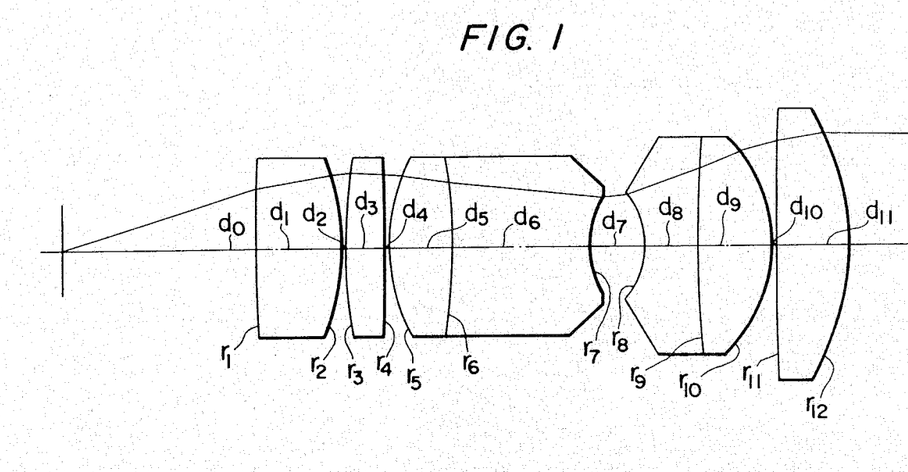
FIG. 1 shows a sectional view of embodiments of Example 1 and 3 of a microscope objective lens system of the present invention.
Figure 2:
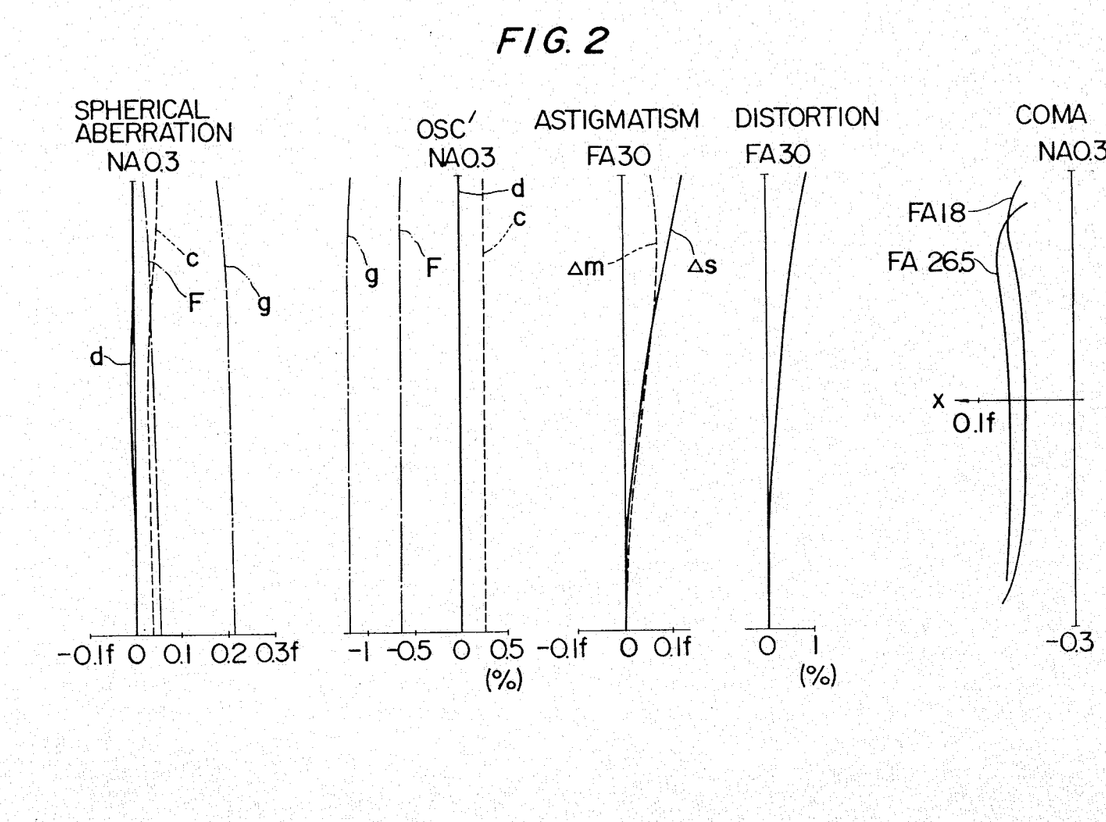
FIG. 2 shows graph illustrating various aberration curves of the embodiment of Example 1.
Figure 3:
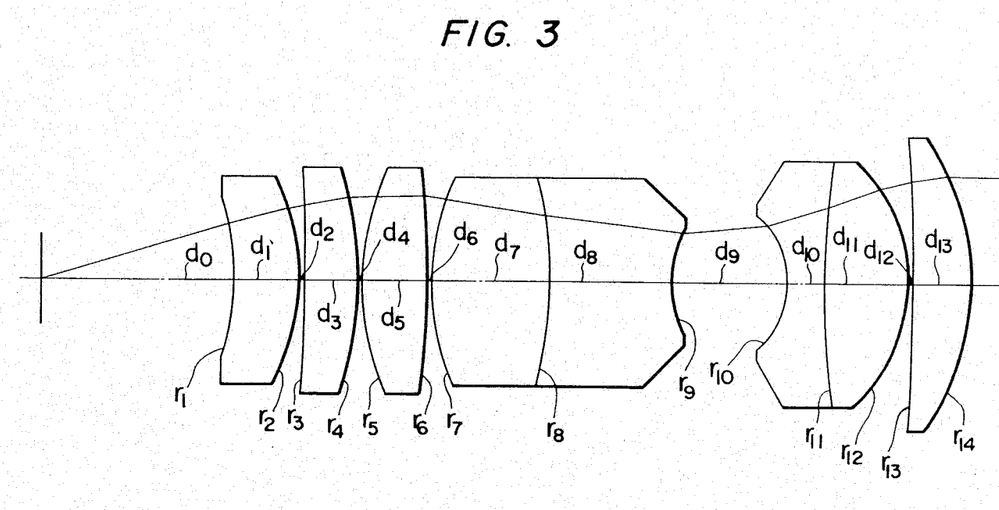
FIG. 3 shows a sectional view of embodiments of Example 2, 4 and 5 of a microscope objective lens system of the present invention.
Figure 4:
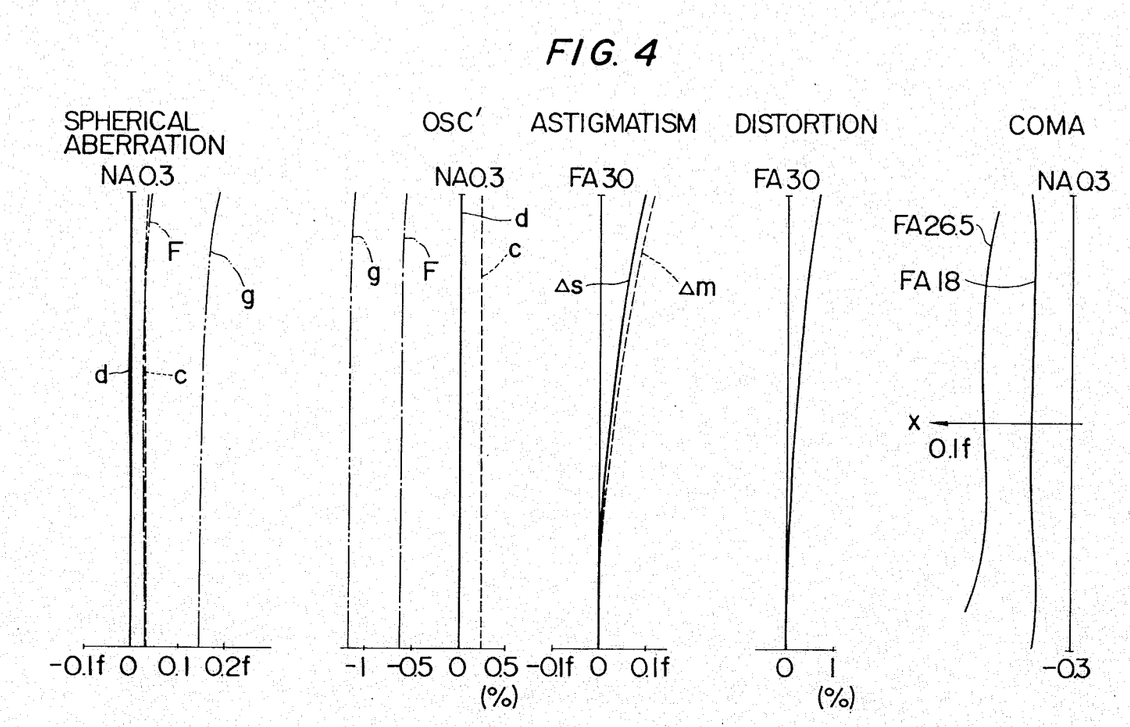
FIG. 4 shows graph illustrating various aberration curves of the embodiment of Example 2.
Figure 5:
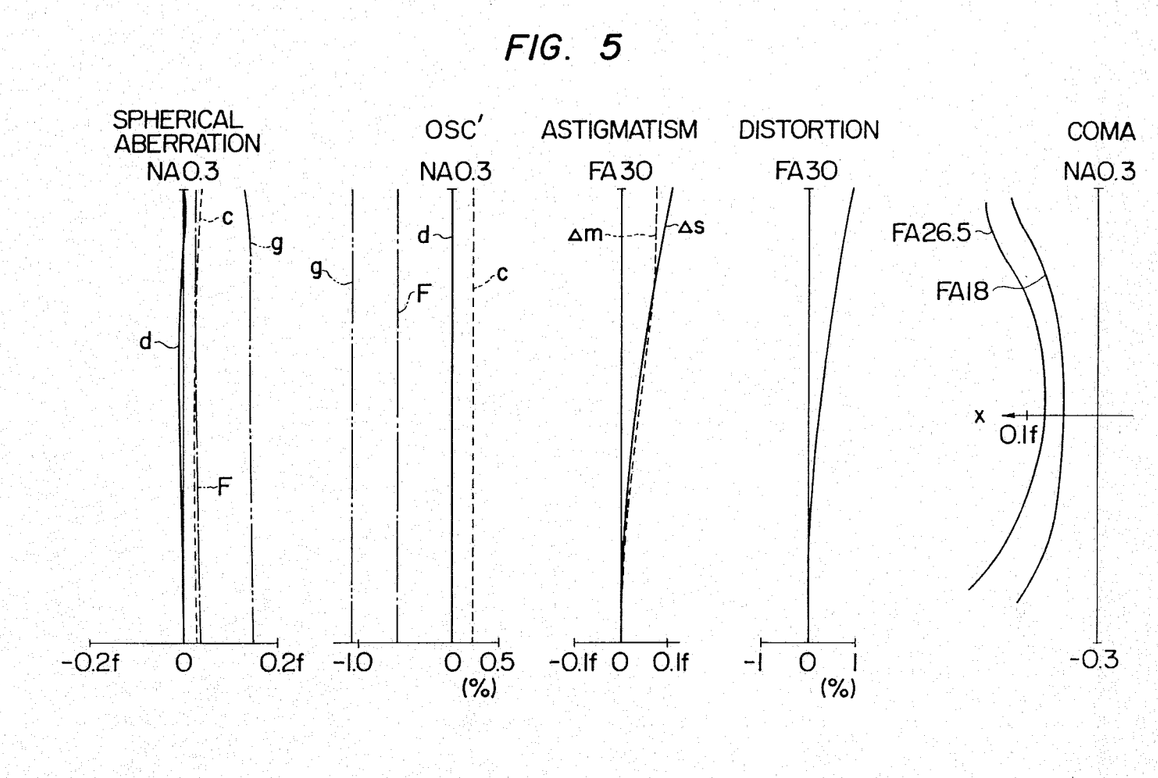
FIG. 5 shows graph illustrating various aberration curves of embodiment of Example 3.
Figure 6:
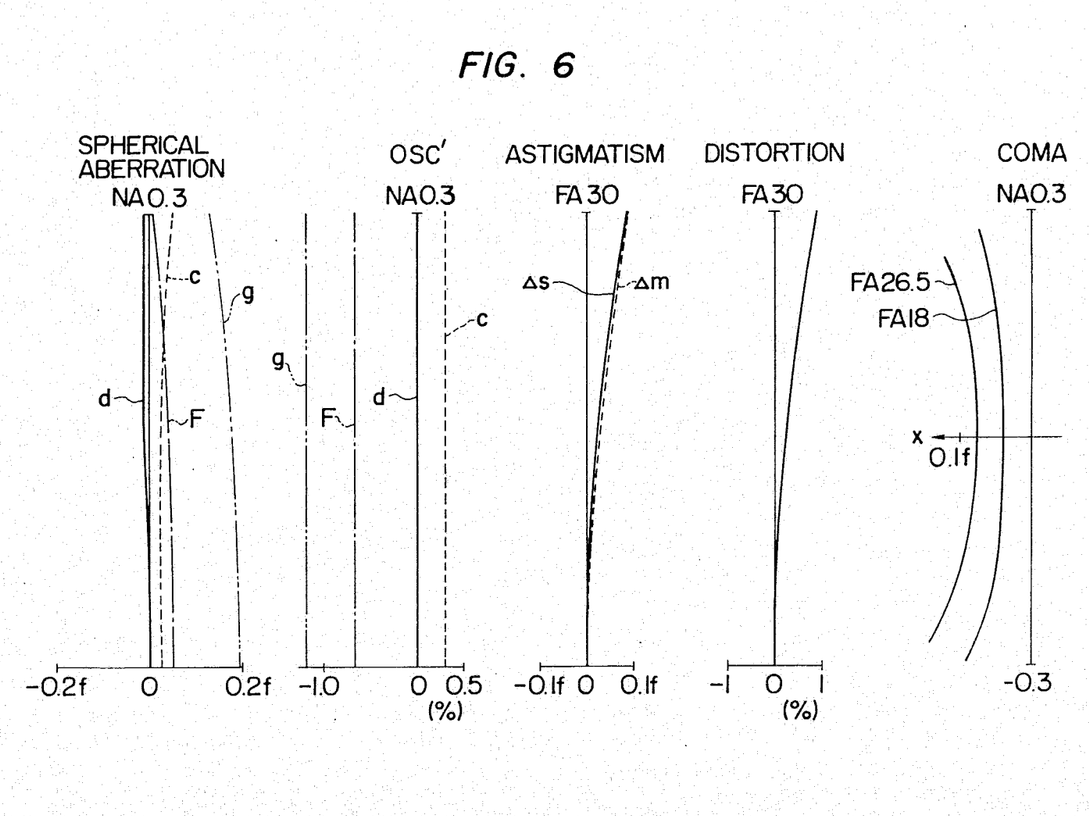
FIGS. 6 and 7 shows graphs illustrating various aberration curves of embodiments of Examples 4 and 5 respectively.
Figure 7:
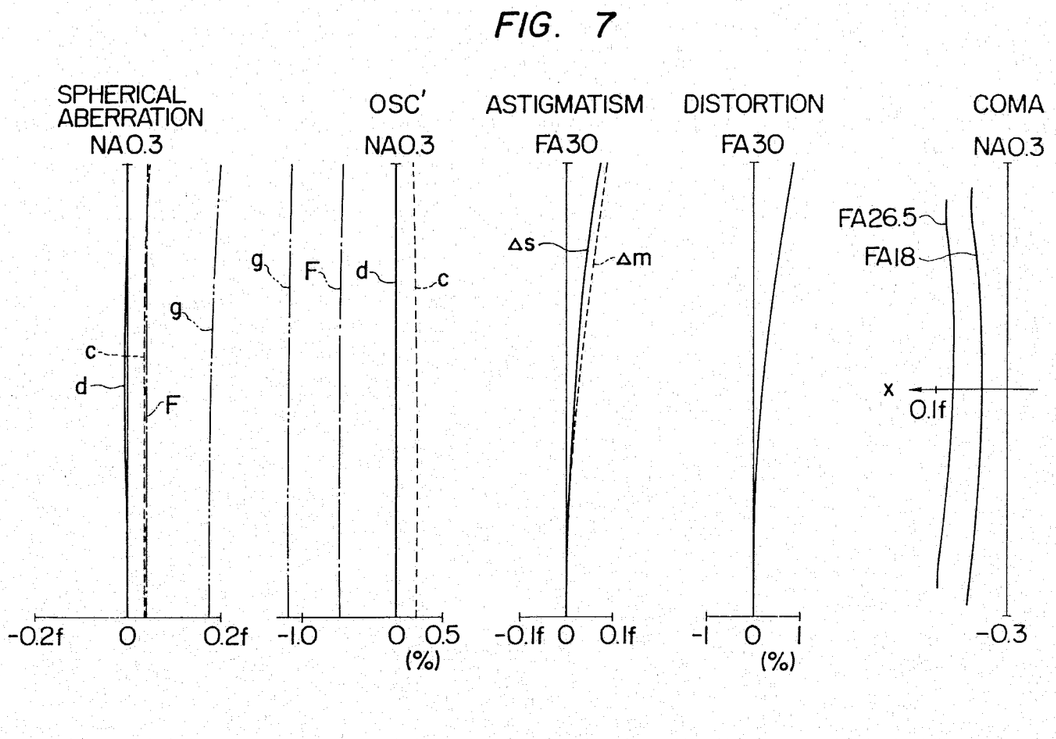

A microscope objective lens system of the present invention comprises, as shown in FIG. 1, a first lens component comprising two or three single positive lenses, a second lens component comprising a cemented meniscus lens having its convex surface faced to the object side, a third lens component comprising a cemented meniscus lens having its concave surface faced to the object side, and a fourth lens component comprising a single positive lens.

This lens system satisfies each of the conditions enumerated below:

$$1.70 \leq n_1 \leq 1.90 \tag{1}$$

$$0.46f \leq D_{II} \leq 0.6f \tag{2}$$

$$65 \leq \nu_{II} \leq 100, \ 65 \leq \nu_{III} \leq 100 \tag{3}$$

$$0.27f \leq |R_{II}| \leq 0.33f, \ 0.15f \leq |R_{III}| \leq 0.25f \tag{4}$$

wherein the reference symbol $n_1$ represents the refractive index of the nearest lens to the object, $D_{II}$ represents the thickness of the second lens component, $\nu_{II}$ represents Abbe's number of the positive lens of the second lens component, $\nu_{III}$ represents Abbe's number of the positive lens of the third lens component, $R_{II}$ represents the radius of curvature of the second lens component at the image side, $R_{III}$ represents the radius of curvature of the third lens component at the object side, and f represents an equivalent focal length of the total lens system.

Next, the reasons for establishing the above-mentioned conditions are hereinafter explained.

The condition (1) is for minimizing the spherical aberration which is caused by making the aperture large. Outside of this condition, the spherical aberration increases, which must be corrected by other lenses, and as a result it becomes difficult to correct the curvature of field and coma.

The condition (2) relates to the spherical aberration, and particularly it is necessary for reducing the inclination (on a graphical display) of the g-line and it is also useful for correcting the lateral chromatic aberration and coma. If the lower limit of this condition is exceeded, there is an increase in the coma, lateral chromatic aberration and spherical aberration. If the upper limit of this condition is exceeded, the lateral chromatic aberration is overcorrected.

The condition (3) is established to make the secondary spectrum of the chromatic aberration small. With a view to correcting the spherical aberration and other aberrations, it is desirable to use high-refractive-index and low-dispersion glass for at least one of the positive lenses of the first lens component or for the fourth lens component. But, in this case, the secondary spectrum tends to generally increase. Therefore, a further increase of the secondary spectrum must be prevented and this is the reason that the condition (3) is established. That is, by using extraordinary-dispersion glass as shown by the condition (3) for the respective positive lenses of the cemented second lens component and the cemented third lens component, the chromatic aberration is well corrected and particularly the secondary spectrum can be made small. Under this condition, when Abbe's number $\nu_{II}$ of the positive lens of the second lens component and Abbe's number $\nu_{III}$ of the positive lens of the third lens component are outside of that condition, the chromatic aberration cannot be corrected and balanced, and the secondary spectrum increases.

The condition (4) concerns the curvature of field. When the upper limits of $R_{II}$ and $R_{III}$ are exceeded, the Petzval sum becomes large so that flatness of the image surface is aggravated, and other surfaces of the lenses cannot correct the curvature of field. When the lower limits are exceeded, the Petzval sum becomes small but coma increases and it is difficult to keep various aberrations balanced.

In addition, though $n_1$ defined by the condition (1) as well as $\nu_{II}$ and $\nu_{III}$ defined by the condition (3) should preferably have large values, the upper limits of these conditions were determined in view of refractive indices and Abbe's numbers of glass materials which are actually obtainable.

Now, some preferred embodiments of the present invention relating the microscope objective lens system as described above are given below:

EXAMPLE 1

| $f = 1$ $\quad$ N.A = 0.3 $\quad$ W.D = 0.449 $\quad$ $\beta = -10X$ |
|---|
| $r_1 = 5.203$ |
| $\quad d_1 = 0.201 \quad n_1 = 1.773 \quad \nu_1 = 49.6$ |
| $r_2 = -0.618$ |
| $\quad d_2 = 0.011$ |
| $r_3 = 1.483$ |
| $\quad d_3 = 0.091 \quad n_2 = 1.804 \quad \nu_2 = 46.6$ |
| $r_4 = -9.262$ |
| $\quad d_4 = 0.011$ |
| $r_5 = 0.467$ |
| $\quad d_5 = 0.149 \quad n_3 = 1.493 \quad \nu_3 = 81.9$ |
| $r_6 = -1.431$ |
| $\quad d_6 = 0.312 \quad n_4 = 1.740 \quad \nu_4 = 31.7$ |
| $r_7 = 0.274$ |
| $\quad d_7 = 0.131$ |
| $r_8 = -0.199$ |
| $\quad d_8 = 0.122 \quad n_5 = 1.719 \quad \nu_5 = 33.5$ |
| $r_9 = 3.220$ |
| $\quad d_9 = 0.170 \quad n_6 = 1.493 \quad \nu_6 = 81.9$ |
| $r_{10} = -0.376$ |
| $\quad d_{10} = 0.011$ |
| $r_{11} = 15.702$ |
| $\quad d_{11} = 0.165 \quad n_7 = 1.729 \quad \nu_7 = 54.7$ |
| $r_{12} = -0.646$ |

EXAMPLE 2

| $f = 1$ $\quad$ N.A = 0.3 $\quad$ W.D = 0.434 $\quad$ $\beta = -10X$ |
|---|
| $r_1 = -0.701$ |
| $\quad d_1 = 0.145 \quad n_1 = 1.804 \quad \nu_1 = 39.6$ |
| $r_2 = -0.543$ |
| $\quad d_2 = 0.011$ |
| $r_3 = -8.362$ |
| $\quad d_3 = 0.121 \quad n_2 = 1.487 \quad \nu_2 = 70.2$ |
| $r_4 = -0.909$ |
| $\quad d_4 = 0.011$ |
| $r_5 = 0.637$ |
| $\quad d_5 = 0.142 \quad n_3 = 1.497 \quad \nu_3 = 81.6$ |
| $r_6 = -2.776$ |
| $\quad d_6 = 0.011$ |
| $r_7 = 0.581$ |
| $\quad d_7 = 0.266 \quad n_4 = 1.497 \quad \nu_4 = 81.6$ |
| $r_8 = -1.000$ |
| $\quad d_8 = 0.272 \quad n_5 = 1.740 \quad \nu_5 = 31.7$ |
| $r_9 = 0.300$ |
| $\quad d_9 = 0.261$ |
| $r_{10} = -0.206$ |
| $\quad d_{10} = 0.080 \quad n_6 = 1.596 \quad \nu_6 = 39.2$ |
| $r_{11} = 2.234$ |
| $\quad d_{11} = 0.186 \quad n_7 = 1.497 \quad \nu_7 = 81.6$ |

-continued

| $f = 1$ $\quad$ N.A = 0.3 $\quad$ W.D = 0.434 $\quad$ $\beta = -10X$ |
|---|
| $r_{12} = -0.406$ |
| $\quad d_{12} = 0.011$ |
| $r_{13} = -4.064$ |
| $\quad d_{13} = 0.131 \quad n_8 = 1.729 \quad \nu_8 = 54.7$ |
| $r_{14} = -0.612$ |

EXAMPLE 3

| $f = 1$ $\quad$ N.A = 0.3 $\quad$ W.D = 0.456 $\quad$ $\beta = -10X$ |
|---|
| $r_1 = -3.864$ |
| $\quad d_1 = 0.203 \quad n_1 = 1.723 \quad \nu_1 = 38.0$ |
| $r_2 = -0.615$ |
| $\quad d_2 = 0.011$ |
| $r_3 = 0.857$ |
| $\quad d_3 = 0.096 \quad n_2 = 1.497 \quad \nu_2 = 81.6$ |
| $r_4 = -1.361$ |
| $\quad d_4 = 0.011$ |
| $r_5 = 0.503$ |
| $\quad d_5 = 0.152 \quad n_3 = 1.497 \quad \nu_3 = 81.6$ |
| $r_6 = -2.101$ |
| $\quad d_6 = 0.316 \quad n_4 = 1.740 \quad \nu_4 = 31.7$ |
| $r_7 = 0.278$ |
| $\quad d_7 = 0.125$ |
| $r_8 = -0.204$ |
| $\quad d_8 = 0.129 \quad n_5 = 1.719 \quad \nu_5 = 33.5$ |
| $r_9 = 2.365$ |
| $\quad d_9 = 0.176 \quad n_6 = 1.497 \quad \nu_6 = 81.6$ |
| $r_{10} = -0.388$ |
| $\quad d_{10} = 0.011$ |
| $r_{11} = 7.920$ |
| $\quad d_{11} = 0.171 \quad n_7 = 1.670 \quad \nu_7 = 51.6$ |
| $r_{12} = -0.647$ |

EXAMPLE 4

| $f = 1$ $\quad$ N.A = 0.3 $\quad$ W.D = 0.462 $\quad$ $\beta = -10X$ |
|---|
| $r_1 = -0.729$ |
| $\quad d_1 = 0.192 \quad n_1 = 1.804 \quad \nu_1 = 46.6$ |
| $r_2 = -0.627$ |
| $\quad d_2 = 0.011$ |
| $r_3 = -49.840$ |
| $\quad d_3 = 0.161 \quad n_2 = 1.497 \quad \nu_2 = 81.6$ |
| $r_4 = -0.990$ |
| $\quad d_4 = 0.011$ |
| $r_5 = 1.039$ |
| $\quad d_5 = 0.164 \quad n_3 = 1.497 \quad \nu_3 = 81.6$ |
| $r_6 = -1.878$ |
| $\quad d_6 = 0.011$ |
| $r_7 = 0.606$ |
| $\quad d_7 = 0.278 \quad n_4 = 1.517 \quad \nu_4 = 69.6$ |
| $r_8 = 3.590$ |
| $\quad d_8 = 0.300 \quad n_5 = 1.785 \quad \nu_5 = 26.2$ |
| $r_9 = 0.323$ |
| $\quad d_9 = 0.207$ |
| $r_{10} = -0.239$ |
| $\quad d_{10} = 0.107 \quad n_6 = 1.645 \quad \nu_6 = 40.6$ |
| $r_{11} = 3.761$ |
| $\quad d_{11} = 0.205 \quad n_7 = 1.434 \quad \nu_7 = 95.2$ |
| $r_{12} = -0.417$ |
| $\quad d_{12} = 0.011$ |
| $r_{13} = 10.967$ |
| $\quad d_{13} = 0.144 \quad n_8 = 1.623 \quad \nu_8 = 57.1$ |
| $r_{14} = -0.702$ |

EXAMPLE 5

| $f = 1$ $\quad$ N.A = 0.3 $\quad$ W.D = 0.436 $\quad$ $\beta = -10X$ |
|---|
| $r_1 = -0.871$ |
| $\quad d_1 = 0.152 \quad n_1 = 1.834 \quad \nu_1 = 37.2$ |
| $r_2 = -0.601$ |

-continued

| $f = 1$ $N.A = 0.3$ $W.D = 0.436$ $\beta = -10X$ | | | |
|---|---|---|---|
| | $d_2 = 0.011$ | | |
| $r_3 = -3.400$ | | | |
| | $d_3 = 0.129$ | $n_2 = 1.487$ | $\nu_2 = 70.2$ |
| $r_4 = -0.827$ | | | |
| | $d_4 = 0.011$ | | |
| $r_5 = 0.884$ | | | |
| | $d_5 = 0.150$ | $n_3 = 1.497$ | $\nu_3 = 81.6$ |
| $r_6 = -1.552$ | | | |
| | $d_6 = 0.011$ | | |
| $r_7 = 0.484$ | | | |
| | $d_7 = 0.257$ | $n_4 = 1.434$ | $\nu_4 = 95.2$ |
| $r_8 = -2.398$ | | | |
| | $d_8 = 0.277$ | $n_5 = 1.740$ | $\nu_5 = 28.3$ |
| $r_9 = 0.287$ | | | |
| | $d_9 = 0.250$ | | |
| $r_{10} = -0.227$ | | | |
| | $d_{10} = 0.093$ | $n_6 = 1.676$ | $\nu_6 = 37.5$ |
| $r_{11} = 2.660$ | | | |
| | $d_{11} = 0.181$ | $n_7 = 1.487$ | $\nu_7 = 70.2$ |
| $r_{12} = -0.421$ | | | |
| | $d_{12} = 0.011$ | | |
| $r_{13} = -7.687$ | | | |
| | $d_{13} = 0.135$ | $n_8 = 1.729$ | $\nu_8 = 54.7$ |
| $r_{14} = -0.616$ | | | | wherein the reference symbols $r_1$ through $r_{14}$ represent radii of curvature of respective lens surfaces, the reference symbols $d_1$ through $d_{13}$ represent thicknesses of respective lenses and air spaces between lenses, the reference symbols $n_1$ through $n_8$ represent refractive indices of respective lenses and the reference symbols $\nu_1$ through $\nu_8$ represent Abbe's numbers of respective lenses.

As has been explained in detail hereinabove and shown by the examples, in the microscope objective lens system according to the present invention, N.A is 0.3 with an improved resolving power and brightness whereas N.A is 0.25 in a conventional plan objective lens system which has a magnification in the order of 10×. A working distance in a conventional objective lens system is 7.2 mm as the maximum but, in the lens system of the present invention, it is longer, that is, 8.0 mm in the Example 1 and 7.5 mm in the Example 2. Further, the present invention has enabled making the image surface flat over a much wider visual field, up to a field number of 30. In addition, the various aberrations are well corrected, and especially the longitudinal spherical aberrations, when converted into wave front aberrations, correspond to 1/52 wave length (on a d-line) in Example 1 and 1/111 wave length (on a d-line) in Example 2, respectively, thus the objective lens system of the present invention is much superior as compared with a conventional objective lens system.

I claim:

1. A microscope objective lens system comprising a first lens component including at least two single positive lens elements, a second lens component including a meniscus cemented doublet component consisting of a positive element and a negative element and having a convex surface on the object side, a third lens component including a meniscus cemented doublet component consisting of a positive element and a negative element and having a concave surface on the object side, and a fourth lens component including a single positive lens element, said lens system satisfying the following conditions:

$$1.70 \leq n_1 \leq 1.90 \tag{1}$$

$$0.46f \leq D_{II} \leq 0.6f \tag{2}$$

$$65 \leq \nu_{II} \leq 100, \ 65 \leq \nu_{III} \leq 100 \tag{3}$$

$$0.27f \leq |R_{II}| \leq 0.33f, \ 0.15f \leq |R_{III}| \leq 0.25f \tag{4}$$

wherein the reference symbol $n_1$ represents the refractive index of the single positive lens element of said first lens component located nearest the object, $D_{II}$ represents the thickness of the second lens component, $\nu_{II}$ represents Abbe's number of the positive lens of the second lens component, $\nu_{III}$ represents Abbe's number of the positive lens of the third lens component, $R_{II}$ represents the radius of curvature of the second lens component at the image side, $R_{III}$ represents the radius of curvature of the third lens component at the object side, and f represents an equivalent focal length of the total lens system.

2. A microscope objective lens system according to claim 1, in which the said first lens component including two single positive lenses, having the following numerical data:

| $f = 1$ $N.A = 0.3$ $W.D = 0.449$ $\beta = -10X$ | | | |
|---|---|---|---|
| $r_1 = 5.203$ | | | |
| | $d_1 = 0.201$ | $n_1 = 1.773$ | $\nu_1 = 49.6$ |
| $r_2 = -0.618$ | | | |
| | $d_2 = 0.011$ | | |
| $r_3 = 1.483$ | | | |
| | $d_3 = 0.091$ | $n_2 = 1.804$ | $\nu_2 = 46.6$ |
| $r_4 = -9.262$ | | | |
| | $d_4 = 0.011$ | | |
| $r_5 = 0.467$ | | | |
| | $d_5 = 0.149$ | $n_3 = 1.493$ | $\nu_3 = 81.9$ |
| $r_6 = -1.431$ | | | |
| | $d_6 = 0.312$ | $n_4 = 1.740$ | $\nu_4 = 31.7$ |
| $r_7 = 0.274$ | | | |
| | $d_7 = 0.131$ | | |
| $r_8 = -0.199$ | | | |
| | $d_8 = 0.122$ | $n_5 = 1.719$ | $\nu_5 = 33.5$ |
| $r_9 = 3.220$ | | | |
| | $d_9 = 0.170$ | $n_6 = 1.493$ | $\nu_6 = 81.9$ |
| $r_{10} = -0.376$ | | | |
| | $d_{10} = 0.011$ | | |
| $r_{11} = 15.702$ | | | |
| | $d_{11} = 0.165$ | $n_7 = 1.729$ | $\nu_7 = 54.7$ |
| $r_{12} = -0.646$ | | | | wherein the reference symbol f represents an equivalent focal length of total lens system, N.A represents the numerical aperture, W.D represents the working distance, $\beta$ represents the magnification, $r_1$ through $r_{12}$ represent radii of curvature of respective lens surfaces, $d_1$ through $d_{11}$ represent thicknesses of respective lenses and airspaces between lenses, $n_1$ through $n_7$ represent refractive indices of respective lenses and $\nu_1$ through $\nu_7$ represent Abbe's numbers of respective lenses.

3. A microscope objective lens system according to claim 1, in which the said first lens component including three single positive lenses, having the following numerical data:

| $f = 1$ $N.A = 0.3$ $W.D = 0.434$ $\beta = -10X$ | | | |
|---|---|---|---|
| $r_1 = -0.701$ | | | |
| | $d_1 = 0.145$ | $n_1 = 1.804$ | $\nu_1 = 39.6$ |
| $r_2 = -0.543$ | | | |
| | $d_2 = 0.011$ | | |
| $r_3 = -8.362$ | | | |
| | $d_3 = 0.121$ | $n_2 = 1.487$ | $\nu_2 = 70.2$ |
| $r_4 = -0.909$ | | | |
| | $d_4 = 0.011$ | | |
| $r_5 = 0.637$ | | | |
| | $d_5 = 0.142$ | $n_3 = 1.497$ | $\nu_3 = 81.6$ |

-continued

| | | | | |
|---|---|---|---|---|
| f = 1 | N.A = 0.3 | W.D = 0.434 | β = −10X | |
| $r_6 = -2.776$ | | | | |
| | $d_6 = 0.011$ | | | |
| $r_7 = 0.581$ | | | | |
| | $d_7 = 0.266$ | $n_4 = 1.497$ | $v_4 = 81.6$ | |
| $r_8 = -1.000$ | | | | |
| | $d_8 = 0.272$ | $n_5 = 1.740$ | $v_5 = 31.7$ | |
| $r_9 = 0.300$ | | | | |
| | $d_9 = 0.261$ | | | |
| $r_{10} = -0.206$ | | | | |
| | $d_{10} = 0.080$ | $n_6 = 1.596$ | $v_6 = 39.2$ | |
| $r_{11} = 2.234$ | | | | |
| | $d_{11} = 0.186$ | $n_7 = 1.497$ | $v_7 = 81.6$ | |
| $r_{12} = -0.406$ | | | | |
| | $d_{12} = 0.011$ | | | |
| $r_{13} = -4.064$ | | | | |
| | $d_{13} = 0.131$ | $n_8 = 1.729$ | $v_8 = 54.7$ | |
| $r_{14} = -0.612$ | | | | | wherein the reference symbol f represents an equivalent focal length of total lens system, N.A represents the numerical aperture, W.D represents the working distance, β represents the magnification, $r_1$ through $r_{14}$ represent radii of curvature of respective lens surfaces, $d_1$ through $d_{13}$ represent thicknesses of respective lenses and air spaces between the lenses, $n_1$ through $n_8$ represent refractive indices of respective lenses and $v_1$ through $v_8$ represent Abbe's numbers of respective lenses.

4. A microscope objective lens system according to claim 1, in which the said first lens component including two single positive lenses, having the following numerical data:

| | | | | |
|---|---|---|---|---|
| f = 1 | N.A = 0.3 | W.D = 0.456 | β = −10X | |
| $r_1 = -3.864$ | | | | |
| | $d_1 = 0.203$ | $n_1 = 1.723$ | $v_1 = 38.0$ | |
| $r_2 = -0.615$ | | | | |
| | $d_2 = 0.011$ | | | |
| $r_3 = 0.857$ | | | | |
| | $d_3 = 0.096$ | $n_2 = 1.497$ | $v_2 = 81.6$ | |
| $r_4 = -1.361$ | | | | |
| | $d_4 = 0.011$ | | | |
| $r_5 = 0.503$ | | | | |
| | $d_5 = 0.152$ | $n_3 = 1.497$ | $v_3 = 81.6$ | |
| $r_6 = -2.101$ | | | | |
| | $d_6 = 0.316$ | $n_4 = 1.740$ | $v_4 = 31.7$ | |
| $r_7 = 0.278$ | | | | |
| | $d_7 = 0.125$ | | | |
| $r_8 = -0.204$ | | | | |
| | $d_8 = 0.129$ | $n_5 = 1.719$ | $v_5 = 33.5$ | |
| $r_9 = 2.365$ | | | | |
| | $d_9 = 0.176$ | $n_6 = 1.497$ | $v_6 = 81.6$ | |
| $r_{10} = -0.388$ | | | | |
| | $d_{10} = 0.011$ | | | |
| $r_{11} = 7.920$ | | | | |
| | $d_{11} = 0.171$ | $n_7 = 1.670$ | $v_7 = 51.6$ | |
| $r_{12} = -0.647$ | | | | | wherein the reference symbol f represents an equivalent focal length of total lens system, N.A represents the numerical aperture, w.D represents the working distance, β represents the magnification, $r_1$ through $r_{12}$ represent radii of curvature of respective lens surfaces, $d_1$ through $d_{11}$ represent thicknesses of respective lenses and air-spaces between lenses, $n_1$ through $n_7$ represent refractive indices of respective lenses and $v_1$ through $v_7$ represent Abbe's numbers of respective lenses.

5. A microscope objective lens system according to claim 1, in which the said first lens component including three single positive lenses, having the following numerical data:

| | | | | |
|---|---|---|---|---|
| f = 1 | N.A = 0.3 | W.D = 0.462 | β = −10X | |
| $r_1 = -0.729$ | | | | |
| | $d_1 = 0.192$ | $n_1 = 1.804$ | $v_1 = 46.6$ | |
| $r_2 = -0.627$ | | | | |
| | $d_2 = 0.011$ | | | |
| $r_3 = -49.840$ | | | | |
| | $d_3 = 0.161$ | $n_2 = 1.497$ | $v_2 = 81.6$ | |
| $r_4 = -0.990$ | | | | |
| | $d_4 = 0.011$ | | | |
| $r_5 = 1.039$ | | | | |
| | $d_5 = 0.164$ | $n_3 = 1.497$ | $v_3 = 81.6$ | |
| $r_6 = -1.878$ | | | | |
| | $d_6 = 0.011$ | | | |
| $r_7 = 0.606$ | | | | |
| | $d_7 = 0.278$ | $n_4 = 1.517$ | $v_4 = 69.6$ | |
| $r_8 = 3.590$ | | | | |
| | $d_8 = 0.300$ | $n_5 = 1.785$ | $v_5 = 26.2$ | |
| $r_9 = 0.323$ | | | | |
| | $d_9 = 0.207$ | | | |
| $r_{10} = -0.239$ | | | | |
| | $d_{10} = 0.107$ | $n_6 = 1.645$ | $v_6 = 40.6$ | |
| $r_{11} = 3.761$ | | | | |
| | $d_{11} = 0.205$ | $n_7 = 1.434$ | $v_7 = 95.2$ | |
| $r_{12} = -0.417$ | | | | |
| | $d_{12} = 0.011$ | | | |
| $r_{13} = 10.967$ | | | | |
| | $d_{13} = 0.144$ | $n_8 = 1.623$ | $v_8 = 57.1$ | |
| $r_{14} = -0.702$ | | | | | wherein the reference symbol f represents an equivalent focal length of total lens system, N.A represents the numerical aperture, W.D represents the working distance, β represents the magnification, $r_1$ through $r_{14}$ represent radii of curvature of respective lens surfaces, $d_1$ through $d_{13}$ represent thicknesses of respective lenses and air spaces between the lenses, $n_1$ through $n_8$ represent refractive indices of respective leses and $v_1$ through $v_8$ represent Abbe's numbers of respective lenses.

6. A microscope objective lens system according to claim 1, in which the said first lens component including three single positive lenses, having the following numerical data:

| | | | | |
|---|---|---|---|---|
| f = 1 | N.A = 0.3 | W.D = 0.436 | β = −10X | |
| $r_1 = -0.871$ | | | | |
| | $d_1 = 0.152$ | $n_1 = 1.834$ | $v_1 = 37.2$ | |
| $r_2 = -0.601$ | | | | |
| | $d_2 = 0.011$ | | | |
| $r_3 = -3.400$ | | | | |
| | $d_3 = 0.129$ | $n_2 = 1.487$ | $v_2 = 70.2$ | |
| $r_4 = -0.827$ | | | | |
| | $d_4 = 0.011$ | | | |
| $r_5 = 0.884$ | | | | |
| | $d_5 = 0.150$ | $n_3 = 1.497$ | $v_3 = 81.6$ | |
| $r_6 = -1.552$ | | | | |
| | $d_6 = 0.011$ | | | |
| $r_7 = 0.484$ | | | | |
| | $d_7 = 0.257$ | $n_4 = 1.434$ | $v_4 = 95.2$ | |
| $r_8 = -2.398$ | | | | |
| | $d_8 = 0.277$ | $n_5 = 1.740$ | $v_5 = 28.3$ | |
| $r_9 = 0.287$ | | | | |
| | $d_9 = 0.250$ | | | |
| $r_{10} = -0.227$ | | | | |
| | $d_{10} = 0.093$ | $n_6 = 1.676$ | $v_6 = 37.5$ | |
| $r_{11} = 2.660$ | | | | |
| | $d_{11} = 0.181$ | $n_7 = 1.487$ | $v_7 = 70.2$ | |
| $r_{12} = -0.421$ | | | | |
| | $d_{12} = 0.011$ | | | |
| $r_{13} = -7.687$ | | | | |
| | $d_{13} = 0.135$ | $n_8 = 1.729$ | $v_8 = 54.7$ | |
| $r_{14} = -0.616$ | | | | | wherein the reference symbol f represents an equivalent focal length of total lens system, N.A represents the numerical aperture, W.D represents the working distance, $\beta$ represents the magnification, $r_1$ through $r_{14}$ represent radii of curvature of respective lens surfaces, $d_1$ through $d_{13}$ represent thicknesses of respective lenses and air spaces between the lenses, $n_1$ through $n_8$ represent refractive indices of respective lenses and $\nu_1$ through $\nu_8$ represent Abbe's numbers of respective lenses.

* * * * *